US012652224B2

(12) United States Patent
Naik et al.

(10) Patent No.: US 12,652,224 B2
(45) Date of Patent: Jun. 9, 2026

(54) DEVICE TYPE DISCOVERY BASED ON NETWORK ADDRESS TRANSLATED NETWORK TRAFFIC

(71) Applicant: Palo Alto Networks, Inc., Santa Clara, CA (US)

(72) Inventors: Deepti Shirish Naik, Cupertino, CA (US); Yilin Zhao, Sunnyvale, CA (US); Ke Tian, San Jose, CA (US); Aveek Kumar Das, Santa Clara, CA (US); Sultanbek Omurzakov, Los Gatos, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 175 days.

(21) Appl. No.: 18/190,420

(22) Filed: Mar. 27, 2023

(65) Prior Publication Data

US 2024/0333613 A1     Oct. 3, 2024

(51) Int. Cl.
*H04L 43/026* (2022.01)
*H04L 67/2885* (2022.01)

(52) U.S. Cl.
CPC ........ *H04L 43/026* (2013.01); *H04L 67/2885* (2013.01)

(58) Field of Classification Search
CPC .......................... H04L 43/026; H04L 67/2885
See application file for complete search history.

(56) References Cited

U.S. PATENT DOCUMENTS

| | | | | |
|---|---|---|---|---|
| 2016/0315952 A1* | 10/2016 | Komárek | ............ | H04L 61/2514 |
| 2019/0190837 A1* | 6/2019 | Wright | .................... | H04L 47/22 |
| 2021/0344607 A1* | 11/2021 | Sreevalsan | .............. | H04L 41/16 |
| 2023/0053716 A1* | 2/2023 | Weinzaepfel | ............ | G06N 3/04 |

OTHER PUBLICATIONS

Guo, et al., "IP-Based IoT Device Detection", IoT S&P '18: Proceedings of the 2018 Workshop on IoT Security and Privacy, Aug. 2018, 7 pages.
Meidan, et al., "A novel approach for detecting vulnerable IoT devices connected behind a home NAT", Computers & Security, Voume 97, Oct. 2020, 101968.
Perdisci, et al., "IoTFinder: Efficient Large-Scale Identification of IoT Devices via Passive DNS Traffic Analysis", In Proceedings of 2020 IEEE European Symposium on Security and Privacy (EuroS &P), Genoa, Italy, Sep. 2020, 16 pages.

* cited by examiner

*Primary Examiner* — Viet D Vu
(74) *Attorney, Agent, or Firm* — GILLIAM IP PLLC

(57)     ABSTRACT

Device type discovery for a private network can be performed based on network address translated (NAT'd) network traffic generated from the network. A security solution analyzes data of network traffic from network devices using a binary classifier to determine whether the network traffic is from a NAT device. A network traffic dataset for a first time interval is preprocessed to generate a feature vector for the binary classifier, the output of which indicates whether the traffic is NAT'd. For NAT'd traffic, the security solution analyzes subsets of the network traffic dataset of smaller intervals within the first time interval. The security solution determines feature values from each network traffic data subset and generates feature vectors which are input to a multiclass classifier to obtain a device classification for each network traffic data subset.

20 Claims, 7 Drawing Sheets

Determine That Network Traffic From Network Device Of Time Interval T Is Network Address Translated And Discover Device Types In Private Network Based On Sub-Intervals Of The Network Traffic Listing Of Device Types
PhoneX
WearableY
ComputerZ

131

NAT Traffic Device Identifier
107

102

110

103

Network Address Translator

108

105

106

104B

104A

101

DEVICE TYPE DISCOVERY BASED ON NETWORK ADDRESS TRANSLATED NETWORK TRAFFIC

BACKGROUND

The disclosure generally relates to transmission of digital information (e.g., CPC subclass H04L43) and to an arrangement for monitoring or testing data switching networks (e.g., CPC subclass H04L43/00).

Network address translation (NAT) was provided as a solution to network address depletion for Internet Protocol version 4 (IPv4) addresses and routing scaling. This was initially proposed in Internet Engineering Task Force (IETF) Request for Comment (RFC) 1631. IETF RFC 3022 then extended RFC 1631 and rendered it obsolete. In addition to address depletion and routing scaling, NAT is also used to preserve privacy of a network's internal addresses.

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Overview

An aspect of securing a network is awareness of the devices within the network. A network is no longer limited to a few types of devices, such as printers and desktop computers. Wearable devices and various portable computers including smartphones and Internet of Things (IoT) devices are introduced into networks and some are transient. While NAT is employed to secure a private network, it conceals or at least reduces visibility into the devices present in the network behind a device (e.g., gateway or router) implementing NAT ("NAT device"). This inhibits securing of the network from outside the perimeter of the network. For example, creating and/or enforcing a policy that leverages device information is challenging, if possible.

A security solution as disclosed herein has been created that uses multiple machine learning models to discover device types present at different times in a private network that uses NAT. The security solution analyzes data of network traffic from network devices using a binary classifier to determine whether the network traffic is from a NAT device. A dataset of the network traffic for a first time interval ("NAT detection interval") is preprocessed to generate a feature vector for the binary classifier which is used to obtain from the binary classifier an indication of whether the traffic is from a NAT device or not. For network traffic determined to be from a NAT device, the security solution analyzes subsets of the network traffic dataset of smaller time intervals ("device classification intervals") that constitute the NAT detection interval. As examples, the NAT detection interval may be 24 hours and a device classification interval may be an hour. The security solution extracts feature values from each network traffic data subset and generates feature vectors which are input to a multiclass classifier to obtain a device classification for each network traffic data subset. The security solution aggregates the device classifications across the device classification intervals and creates a listing of device classifications/types present in the private network at some point during the NAT detection interval. While "device classification" or "device class" and "device type" have a same meaning, the different terms are used in light of possibly different expression. A "device classification" from a classifier may be positional (e.g., second output in an array of outputs from a classifier) and map to a "device type" that is a name or identifier such as VENDOR1_PHONE_OS17.

Example Illustrations

Figure 1:
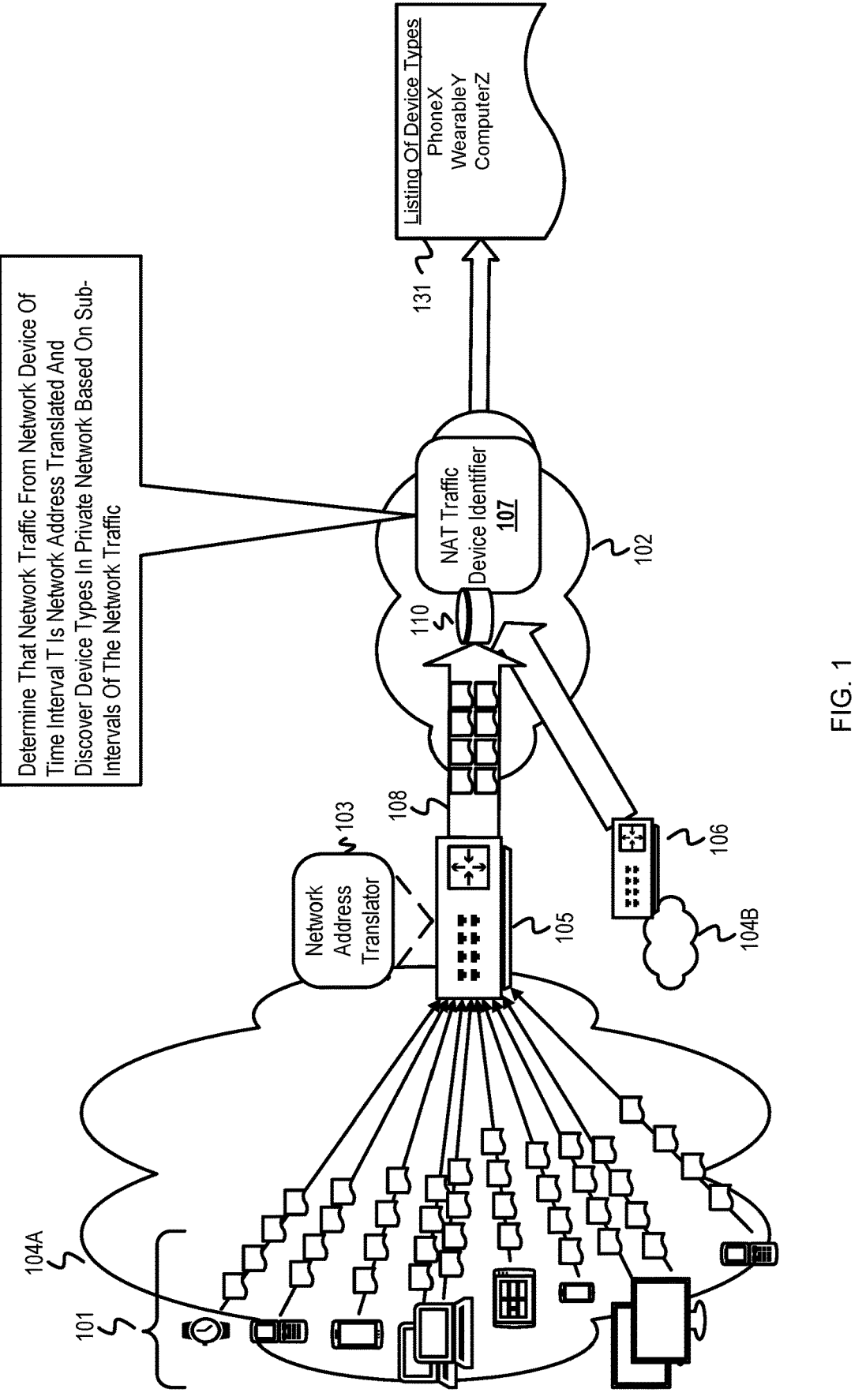
FIGS. 1-2 depict a cybersecurity system that profiles types of devices in a private network based on network address translated traffic from a NAT device of the private network.
Figure 2:
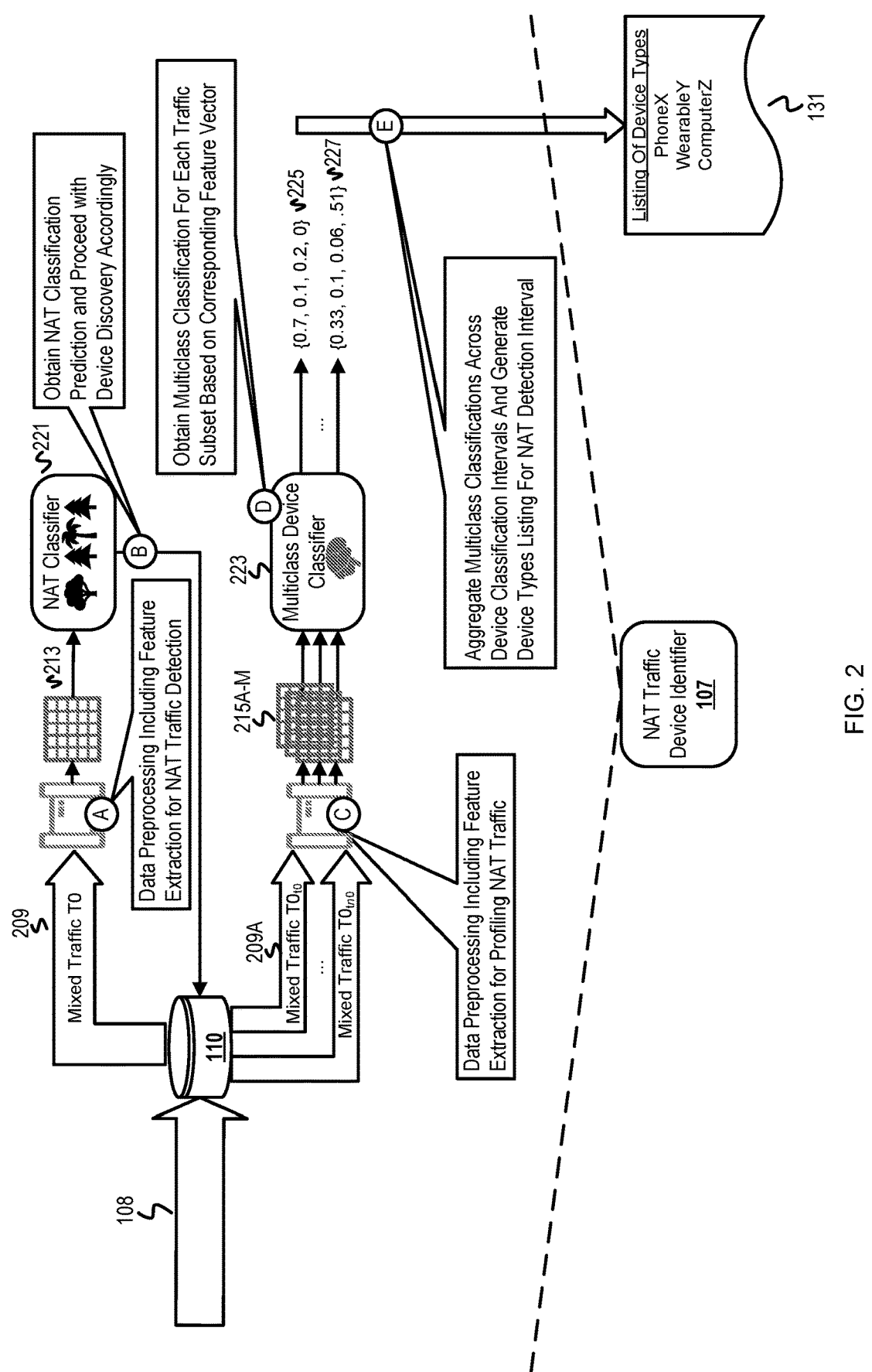

FIGS. 1-2 depict a cybersecurity system that profiles types of devices in a private network based on network address translated traffic from a NAT device of the private network. FIG. 1 provides an initial high-level illustration and FIG. 2 provides a more detailed diagram. FIG. 1 is an example diagram of a cybersecurity system generating a listing of devices detected in a network based on analysis of network traffic from a NAT device of the network. A NAT traffic device identifier 107 accessible as a remote service or Software-as-a-Service (SaaS) via a network 102 analyzes network traffic data from multiple devices which include network devices 105, 106 (e.g., a router or gateway). The network device 105 and the network device 106 reside at perimeters of respective private networks 104A, 104B. This example illustration focuses on the private network 104A for ease of explanation. FIG. 1 illustrates the private network 104A with devices 101. The devices 101 include desktop computers, laptop computers, smartphones, wearable devices, etc. Some of these devices 101 have a transient presence in the private network 104A (e.g., smartphones and wearables). For this illustration, assume a NAT detection interval is 24 hours and a device classification interval is 1 hour. During a NAT detection interval, the devices 101 source different amounts of network traffic at different times during the NAT detection interval, and the network traffic flows through the device 105. After the network address translator 103 performs NAT, network address translated ("NAT'd"), mixed network traffic 108 (or data about the network traffic 108) is stored in a repository 110 accessible by the NAT traffic device identifier 107. The traffic is described as "mixed" since the constituent data is from different device types. This is an ongoing process as long as a device is transmitting data via the device 105.

After network traffic data has been collected for a NAT detection interval, the NAT traffic device identifier 107 analyzes the collected traffic and/or data of a 24-hour time interval (T) to determine whether the device 105 performed NAT on the traffic. If the NAT traffic device identifier 107 detects NAT, then the NAT traffic device identifier 107 analyzes the traffic and/or data at an hourly granularity to discover the device types with strongest signals in each sub-interval of traffic/data in the private network 104A. Based on the device type discovery, the NAT traffic device identifier 107 generates a listing of device types 131.

FIG. 2 is an example diagram of pipelines and machine learning models used for NAT detection and then device classification of NAT traffic by the NAT traffic device identifier 107. The NAT traffic device identifier 107 performs operations to analyze the network traffic which are depicted in FIG. 2 with a series of letters A-E indicating an operational stage, each of which represents one or more operations. Although these stages are ordered for this example, the stages illustrate one example to aid in understanding this disclosure and should not be used to limit the claims. Subject matter falling within the scope of the claims can vary from what is illustrated. The NAT traffic device identifier 107 includes a NAT classifier 221 (e.g., a trained random forest or artificial neural network) and a multiclass device classifier 223 (e.g., a trained artificial neural network). The NAT classifier 221 is a machine learning model that has been trained to classify traffic as being from a NAT device or not being from a NAT device (i.e., indicating a confidence that NAT'd traffic is detected). The multiclass device classifier 223 is a machine learning model that has been trained to indicate likelihood that features representing network traffic correspond to each of a set of device classes/types.

At stage A, the NAT traffic device identifier 107 preprocesses a network traffic dataset 209 of a NAT detection interval TO and generates a feature vector 213. The network traffic dataset 209 may be one or more of captured packets, a log(s), and information extracted from headers and payloads of protocol data units (e.g., packets or datagrams). Preprocessing of the network traffic dataset 209 includes feature extraction, but may also include one or more of cleaning data, re-formatting data, etc. Some of the features in the feature set for NAT traffic detection are traffic statistics, such as volumetric traffic statistics. Examples of volumetric traffic statistics include total bytes, total sessions, total packets, etc. If values for these feature are not already in the network traffic dataset 209 (e.g., calculated by another entity), then preprocessing/feature extraction includes calculating the feature values. The NAT traffic device identifier 107 generates the feature vector 213 with the feature set values extracted from the network traffic dataset 209.

At stage B, the NAT traffic device identifier 107 obtains a NAT classification from the NAT classifier 221 which determines whether or not the NAT traffic device identifier 107 proceeds with device classification. The NAT traffic device identifier 107 inputs the feature vector 213 into the NAT classifier 221 to obtain a NAT classification prediction. The NAT classifier 221 is a binary classifier that outputs a confidence value of whether the traffic corresponding to the feature vector 213 is from a NAT device. A prediction that the traffic is from a "NAT device" is not an indication of a specific hardware, but indicates that NAT was applied to the traffic prior to receipt at the NAT traffic device identifier 207. If the output of the NAT classifier 221 indicates that NAT was applied to the corresponding traffic, then the NAT traffic device identifier 207 proceeds with device discovery.

For device discovery with NAT'd network traffic as determined in stage B, the NAT traffic device identifier 107 processes subsets of the network traffic dataset 209 in stages C and D. Each of the subsets 209A-209M corresponds to one of the smaller intervals or sub-intervals ("device classification interval") within the NAT detection interval and indicated as $t_0$-$t_{n0}$. While the network traffic data subsets 209A-209M may have some overlap with the data in the network traffic dataset 209, the data subsets 209A-209M are not slices of the dataset 209. The NAT traffic device identifier 107 may select each data subset to iterate through the subsets 209A-209M, launch a thread or process to process the subsets 209A-209M concurrently with each thread/child process selecting one of the subsets 209A-209M, etc. Accordingly, stages C and D are described with reference to a "selected one" of the data subsets 209A-109B. This is similarly done with respect to the feature vectors 215A-215M which correspond to the network traffic data subsets 209A-209M.

At stage C, the NAT traffic device identifier 107 preprocesses a selected one of the network traffic data subsets 209A-209M and generates a corresponding one of feature vectors 215A-215M. As in stage A, preprocessing of the selected network traffic data subset includes feature extraction and may also include one or more of cleaning data, re-formatting data, etc. Some of the features in the feature set for device classification for mixed network traffic include application usage features (e.g., listing of applications detected in the data subset), static platform features (e.g., operating system, hostname, manufacturer identifier), and volumetric application statistics (e.g., session count per application and session count per port). If values for these feature are not already in the selected one of the network traffic data subsets 209A-209M, then preprocessing/feature extraction includes calculating the feature values, some or all of which can be done before the NAT classification or after the NAT classification.

At stage D, the NAT traffic device identifier 107 inputs each of the feature vectors 215A-215M into the multiclass device classifier 223 and obtains a multiclass classification for each network traffic subset based on the corresponding feature vector. FIG. 1 illustrates the multiclass device classifier 223 outputting multiclass classifications 225, 227 assuming 4 classes of devices. Each of the multiclass classifications 225, 227 is depicted as an array of confidence values for the device classes.

At stage E, the NAT traffic device identifier 107 aggregates the multiclass classifications across device classification intervals and generates a device types listing 231 for the NAT detection interval. The NAT traffic device identifier 107 traverses the device classifications from the multiclass device classifier 223 and determines which device classes correspond to the classification confidence values that satisfy a criterion for the listing 131 (e.g., highest confidence value). Based on the listing 131, the NAT traffic device identifier 107 has discovered device types PhoneX, Wearable Y, and ComputerZ in the network 104A based on the traffic analysis of the network traffic data of the NAT detection interval.

Figure 3:
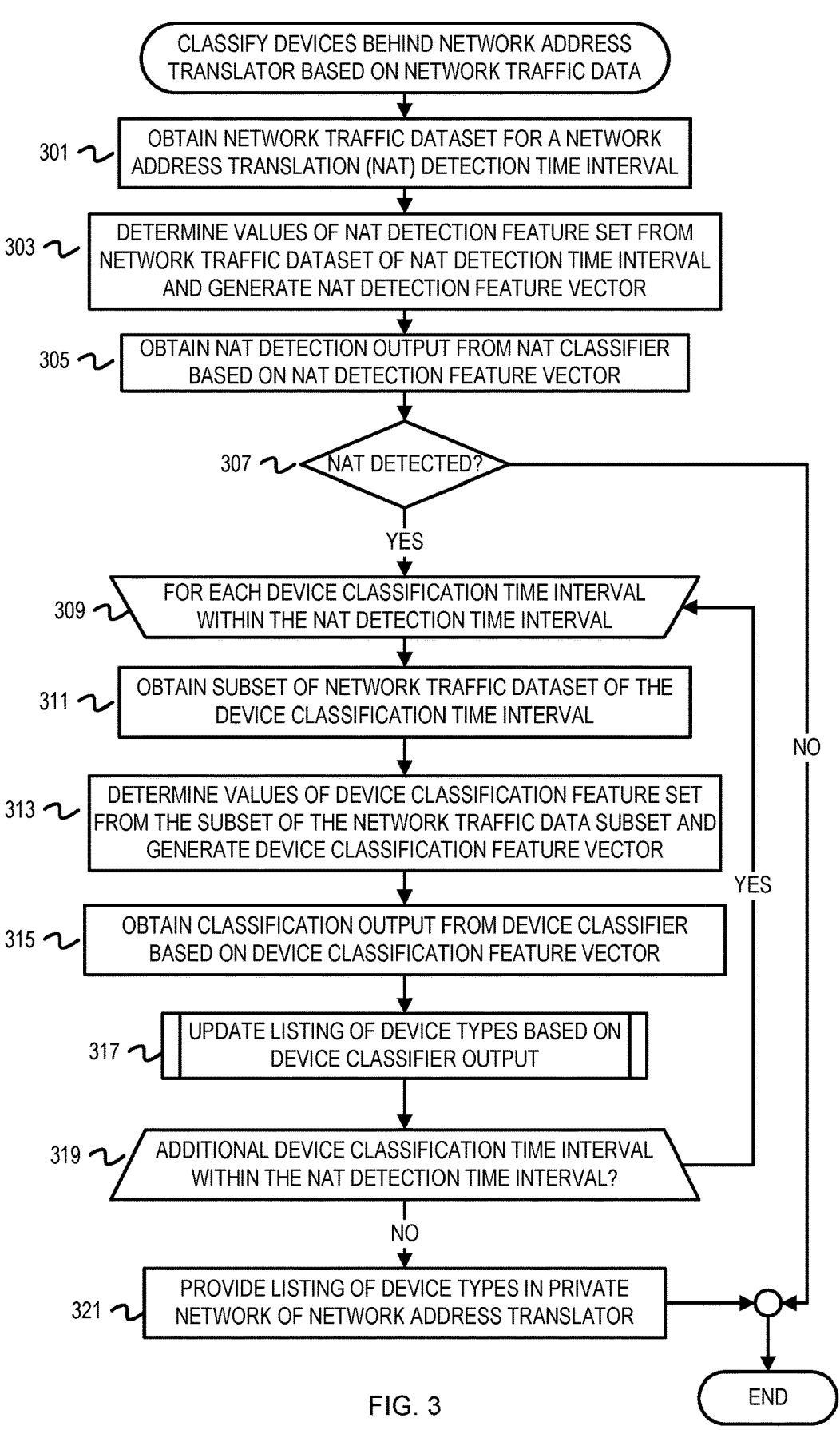
FIG. 3 is a flowchart of example operations for classifying devices behind a network address translator based on network traffic data.
Figure 5:
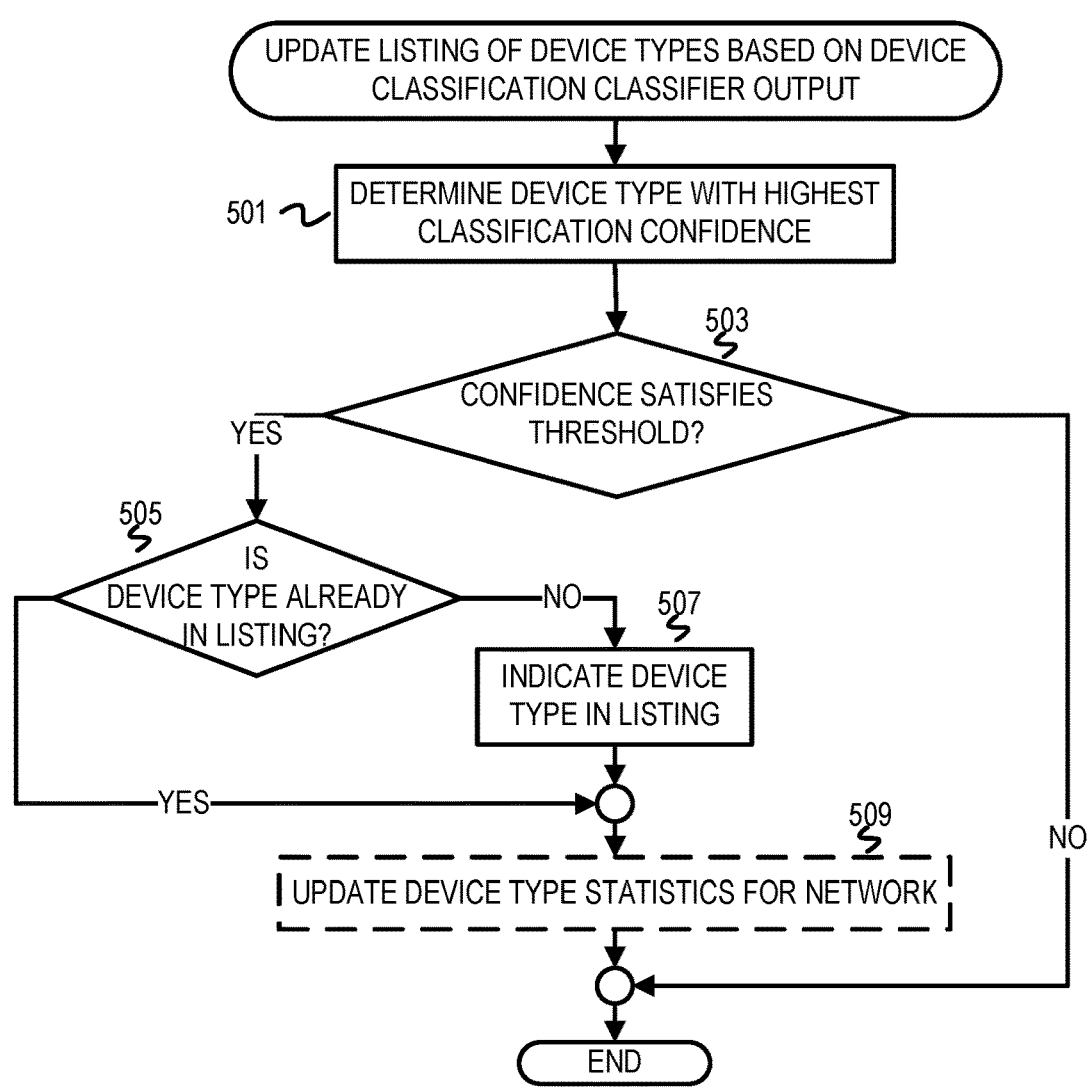
FIG. 5 is a flowchart of example operations for updating a listing of device types based on device classifier output with a highest, sufficient confidence.
Figure 6:
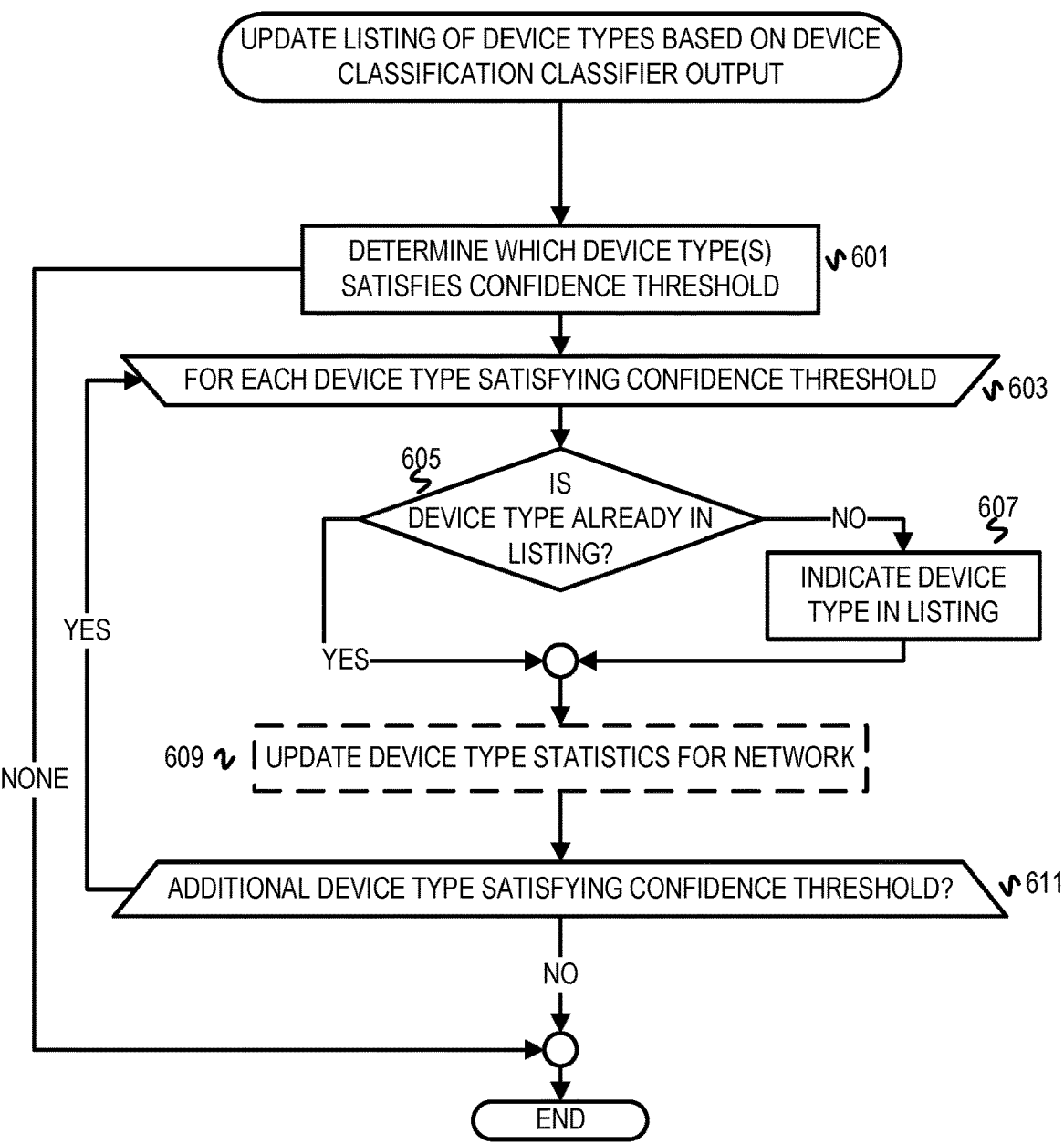
FIG. 6 is a flowchart of example operations for updating a listing of device types based on device classification classifier output with sufficient confidence.

While FIGS. 1-2 are diagrams of an example system, FIGS. 3 and 5-6 are flowcharts of example operations that provide some variations from the specific example illustrated in FIGS. 1-2. For consistency, the example operations are described as being performed by a NAT traffic device identifier.

FIG. 3 is a flowchart of example operations for classifying devices behind a network address translator based on network traffic data. The devices are referred to as being "behind" the network address translator because the traffic from the devices flows through the network address translator before exiting a private network secured by the network address translator.

At block 301, a NAT traffic device identifier obtains a network traffic dataset for a NAT detection time interval. The network traffic dataset may be raw network traffic, a traffic monitoring/inspecting file (e.g., pcap file, pcapng file, etc.), traffic log, data from a network traffic analysis tool, or a combination thereof. Obtaining a network traffic dataset can be according to a defined schedule, such as daily retrieval after expiration of a defined NAT detection interval. While an interval of 24 hours has been used as an example, the size of the NAT detection interval can be configured to a different size based on user preference if the amount of data is sufficient. The NAT detection feature set includes one or more volumetric traffic statistic features that have a minimum time interval to be sufficient information. For example, total bytes and total sessions for less than 12 hours may be weak signals with respect to NAT detection. Furthermore, the sizes of the NAT detection interval and the device classification interval may have a cross-dependence. For instance, the NAT detection feature average time intervals per application indicates, for each application detected during the NAT detection interval, an average of the device classification intervals in which the application was detected. Thus, the NAT detection interval may be constrained to a multiple of the device classification intervals to simplify calculations.

At block 303, the NAT traffic device identifier determines values of a NAT detection feature set from the network traffic dataset of the NAT detection time interval and generates a NAT detection feature vector therefrom. For the NAT detection feature set, features of network traffic data have been selected that collectively provide a strong signal for NAT detection. However, all features are not required. Features for the NAT detection feature set are selected that can still provide a strong signal (i.e., high confidence in accuracy) for NAT detection even when a subset of the feature set is absent. The features are selected for different indicators of constituent content and/or source(s) of network traffic including volumetric indicators, application usage indicators, and device characteristics. An example feature set for NAT detection includes the below feature groups.

Volumetric Feature Group
1. Application count—count of different applications indicated in the network traffic dataset
2. Port count—count of different ports indicated in network traffic dataset
3. Uniform Resource Locator (URL) count—count of different URLs indicated in network traffic dataset
4. Total bytes—count of bytes transmitted
5. Total sessions—count of application layer sessions indicated in the network traffic dataset
6. Total packets—total packets transmitted
7. Average time intervals per application—average of device classification intervals within the NAT detection interval in which each application was detected Device Feature Group
1. Operating System (OS)
2. OS group—grouping of process types to each detected OS
3. Hostname
4. Version of OS
5. Device model
6. Manufacturer identifier Application Usage Feature Group
1. Application list
2. Port list 3. User Agent list—List of User Agents identified in HTTP request headers as indicated in network traffic dataset The above group memberships of features are not strict groupings or any specific hierarchy or schema. For instance, application count may be considered a volumetric feature or an application usage feature. Not all values for the feature set are determined by feature extraction. For instance, values for the volumetric features may already be indicated in a network statistics file while the values for application usage features may be derived from the network traffic dataset (i.e., extracted). It may be the case that the values for the feature set are copied from the network traffic dataset. The NAT traffic device identifier populates a data structure with the values to generate the NAT detection feature vector.

At block 305, the NAT traffic device identifier obtains NAT detection output from a NAT classifier based on the NAT detection feature vector. The NAT traffic device identifier feeds or inputs the generated NAT detection feature vector into a binary classifier that has been trained to detect NAT or detect that the traffic is from a NAT device. A training dataset would have been collected from a NAT device. The trained binary classifier may be agnostic with respect to the device type or may be trained with training data from a selected class or brand of NAT device (e.g., specific to a manufacturer or NAT software). Deployment of a trained binary classifier would then take into account this information.

At block 307, the NAT traffic device identifier determines whether NAT is detected based on the NAT classifier output. The NAT detection is used as a filter for the device classification. If NAT is detected, then operational flow proceeds to block 309. Otherwise, the process ends.

At block 309, the NAT traffic device identifier individually processes subsets of the network traffic dataset according to a device classification interval within the NAT detection time interval. The NAT traffic device identifier can apply a sliding window technique or concurrently process the different device classification intervals of the network traffic dataset. Regardless of the technique for selecting, the operations are described with reference to a selected network traffic data subset to refer to a subset of the network traffic dataset of a device classification interval within the NAT detection interval selected for processing, similar to FIG. 1.

At block 311, the NAT traffic device identifier obtains a subset of the network traffic dataset of the device classification time interval. Continuing with the parameters of the device classification interval being 1 hour and the NAT detection interval being 24 hours starting at midnight each day, the NAT traffic device identifier selects the subset of network traffic data corresponding to the hour starting at midnight. This may be a new query/request to the repository (ies) hosting the data or selection from the dataset already obtained earlier (301).

At block 313, the NAT traffic device identifier determines values of a device classification feature set from the network traffic data subset and generates a device classification feature vector. Since the NAT'd traffic is most likely mixed traffic (i.e., network traffic from different device types), features have been selected that allow for a strong signal to be gleaned for a device type even with IoT devices introduced into a network. As with the NAT detection feature set, some features or feature values in the device classification feature set will be absent or be a default/initialized values that does not provide useful information. An example feature set for device classification includes the below feature groups of a volumetric feature group, device feature group, and ranked application usage feature groups.

Volumetric Feature Group

1. Session count per application
2. Session count per Internet Protocol address
3. Average packet byte size
4. Login count Top-N Ranked Application Usage Feature Group 5. Used applications
6. Domains visited
7. Ports visited
8. Transport Layer Security (TLS) fingerprints-values of TLS Client Hello message fields that identify a client Device Feature Group 7. OS family
8. Application name
9. Application category
10. Geolocation
11. Country code
12. Hostname
13. Remote URL—URL for remote repository of program code
14. Remote IP address-address of a remote computer for a remote connection according to Remote Desktop Protocol (RDP)
15. User Agent content
16. Vendor identifier (e.g., organizationally unique identifier (OUI) and/or Manufacturer name)
17. Binary indicators of which of a set of applications indicated in network traffic data
18. Binary indicators of which OS or OUI indicated in network traffic data The device features alone provide sufficiently strong signal of device type. However, the device features are often not present in NAT traffic. A combination of the volumetric features and the application usage features can be strong signals for device types. The NAT traffic device identifier generates a feature vector for device classification with the determined values for the device classification feature set.

At block 315, the NAT traffic device identifier obtains classification output from the device classifier based on the device classification feature vector. The NAT traffic device identifier inputs the feature vector into a trained multiclass classifier, such as a convolutional neural network or ensemble of neural networks. The multiclass classifier can be trained with training data for a first set of device types and additional training can be done for new/additional device types. Feature extraction would derive the values for the top-N ranked features. Down sampling, encoding, and normalization may be done for some of the features, such as the device features and the application usage features. Various model architectures that accept the different types of features and include a concatenation layer between the hidden layers and an output layer can be used. An example architecture is provided to aid in understanding the subject matter.

Figure 4:
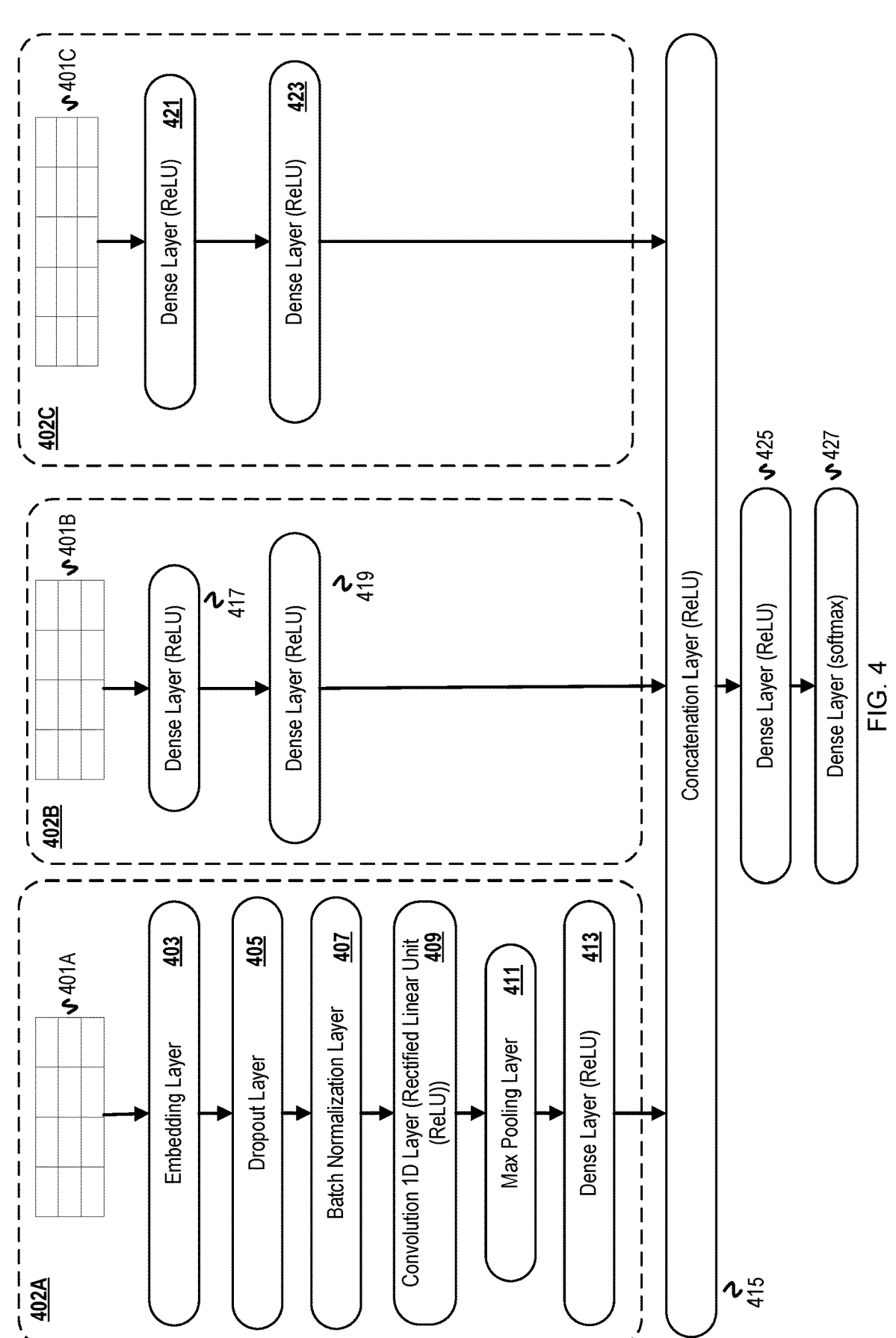
FIG. 4 is a diagram of an example architecture for a multiclass classifier for device classification based on network traffic indicated as network address translated traffic.

FIG. 4 is a diagram of an example architecture for a multiclass classifier for device classification based on network traffic indicated as network address translated traffic. While single arrows are depicted connecting the layers, this is not intended to change the structure of a layer, especially a dense or fully-connected layer. A single arrow is depicted for ease of illustration. The model depicted in FIG. 4 can be described as a convolutional neural network or an ensemble of neural networks. Layers of models or constituent models 402A, 402B, and 402C can be characterized as different artificial neural networks (ANNs), the model 402A being a convolutional neural network (CNN). Accordingly, the input to the models may be multiple feature vectors 401A, 401B, 401C instead of a single feature vector. The feature vector 401A corresponds to the ranked top-N application usage features. The feature vector 401B corresponds to the device features and the feature vector 401C corresponds to the volumetric features. Outputs from a last layer of each of the models 402A-402C are concatenated in a concatenation layer 415 that uses a rectified linear unit (ReLU) for the activation function. The concatenation layer 415 is connected to a dense layer 425 that also uses ReLU for the activation function. The dense layer 425 is connected to the ensemble's output layer 427, which is a dense layer that uses the softmax activation function.

The model 402A includes several layers that implement operations and transformations to reduce overfitting, stabilize inputs, etc. The model 402A scans over the rankings of feature values within the top-N ranked feature group present in the feature vector 401A. The input layer (not depicted due to space constraints) that receives the feature vector 401A is connected to an embedding layer 403. The embedding layer 403 transforms the input feature values. For example, the feature values of the input layer 401A include text or string type data which the embedding layer 403 transforms into numerical values. The embedding layer 403 connects to a dropout layer 405. The dropout layer 405 connects to a batch normalization layer 407. The batch normalization layer 407 connects to a 1-dimensional convolution layer 409 with the ReLU activation function. The convolution layer 409 connects to a max pooling layer 411 which then connects to a dense layer 413 also with the ReLU activation function. The dense layer 413 outputs to the concatenation layer 415.

The models 402B, 402C have a similar architecture. For consistency with the model 402A, the feature vectors 401B, 401C are depicted instead of input layers. The feature vector 401B with values for the device feature group are passed to an input layer that is connected to a dense layer 417 with the ReLU activation function. The dense layer 417 is connected to a dense layer 419 also using the ReLU activation function. The feature vector 401C with values for the volumetric feature group are passed to an input layer that is connected to a dense layer 421 with the ReLU activation function. The dense layer 421 is connected to a dense layer 423 also using the ReLU activation function. The dense layers 419, 421 are connected to the concatenation layer 415. Although the example illustration refers to neural networks, embodiments are not limited to neural networks. For instance, a logistic regression model(s) can be trained to be the device classifier.

Returning to FIG. 3, the NAT traffic device identifier updates a listing of device types based on the device classifier output at block 317. Embodiments can indicate in the listing a device type corresponding to the highest confidence value that satisfies a threshold or each device type corresponding to a confidence value that satisfies a threshold. Example operations for updating the device types listing are depicted in FIGS. 5 and 6.

At block 319, the NAT traffic device identifier determines whether there is an additional device classification time interval within the NAT detection time interval with a corresponding network traffic data subset. If there is an additional network traffic data subset, then operational flow returns to block 309. If not, then operational flow proceeds to block 321.

At block 321, the NAT traffic device identifier provides the listing of device types discovered in the private network of the network address translator. Providing the listing of device types can be updating a visualization (e.g., updating a graphical user interface dashboard, updating a file, etc.).

FIG. 5 is a flowchart of example operations for updating a listing of device types based on device classification classifier output with a highest, sufficient confidence. The example operations presume that a confidence threshold has been defined for a device class to qualify for selection for a given time interval. The defined confidence threshold will have been selected based on evaluation of accuracy of the model. Since the network traffic is mixed, a collection of feature values that typically strongly signal a device type may be weakened by a greater variety of network traffic in the given time interval. In other words, a greater mixture of traffic can impact confidence. A user may adjust the threshold based on a desired tradeoff between accuracy and increased sensitivity to device type signals in the feature values.

At block 501, the NAT traffic device identifier determines a device type/class with a highest classification confidence. The output of the multiclass classifier will be an array of confidence values with each position corresponding to a different device type. The NAT traffic device identifier will traverse the confidence values to determine which is the greatest value.

At block 503, the NAT traffic device identifier determines whether the confidence value determined to be the greatest in the output values satisfies a confidence threshold. If the greatest confidence value for the given time interval satisfies the threshold, then operational flow proceeds to block 505. Otherwise, operational flow ends and no device type is indicated for the corresponding time interval.

At block 505, the NAT traffic device identifier determines whether the device type corresponding to the confidence value that satisfies the threshold is already in the listing. If the device type is already indicated, then operational flow proceeds to block 409. If not, then operational flow proceeds to block 507.

At block 507, the NAT traffic device identifier indicates the device type corresponding to the greatest confidence value that satisfies the threshold. For example, the NAT traffic device identifier updates a file or data structure to indicate the device type.

At block 509, the NAT traffic device identifier updates device type statistics for the network. Statistics for model evaluation or network activity may be desired by an owner or user of the network generating the network traffic. For instance, information may be maintained that indicates number of intervals and times when device types are detected. Block 509 is depicted in a dashed line to indicate it as an optional block.

FIG. 6 is a flowchart of example operations for updating a listing of device types based on device classification classifier output with sufficient confidence. Since different device types may be present in a private network, an embodiment may choose to indicate multiple device types as detected for a given time interval based on confidence values. While every represented device type would not have a sufficiently strong signal (i.e., sufficient confidence value), embodiments may set a threshold that allows for detection of multiple device types in a time interval of network traffic.

At block 601, the NAT traffic device identifier determines which device type(s) satisfies a defined confidence threshold. The NAT traffic device identifier evaluates each of the output confidence values against the defined threshold to determine which satisfy the threshold. An implementation may instead choose a top N of the confidence values that satisfy the threshold.

At block 603, the NAT traffic device identifier processes each device type corresponding to a confidence value determined as satisfying the threshold. At block 605, the NAT traffic device identifier determines whether the device type is already in the device type listing. If the device type is already listed, then operational flow proceeds to block 609, which is similar to block 509 of FIG. 5. If the device type is not already listed, then the NAT traffic device identifier indicates the device type in the listing at block 607. If block 607 is being performed, operational flow proceeds from 607 to 609.

At block 611, the NAT traffic device identifier determines whether there is an additional device type corresponding to a confidence value that satisfies the threshold. If so, then operational flow returns to block 603. Otherwise, the process ends.

The disclosed technology can process historical network traffic data from different network devices from a same or different networks. A same listing can be maintained for a network and updated based on the results of the multiclass device classification for multiple devices on a perimeter of the network. If the device discovery The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
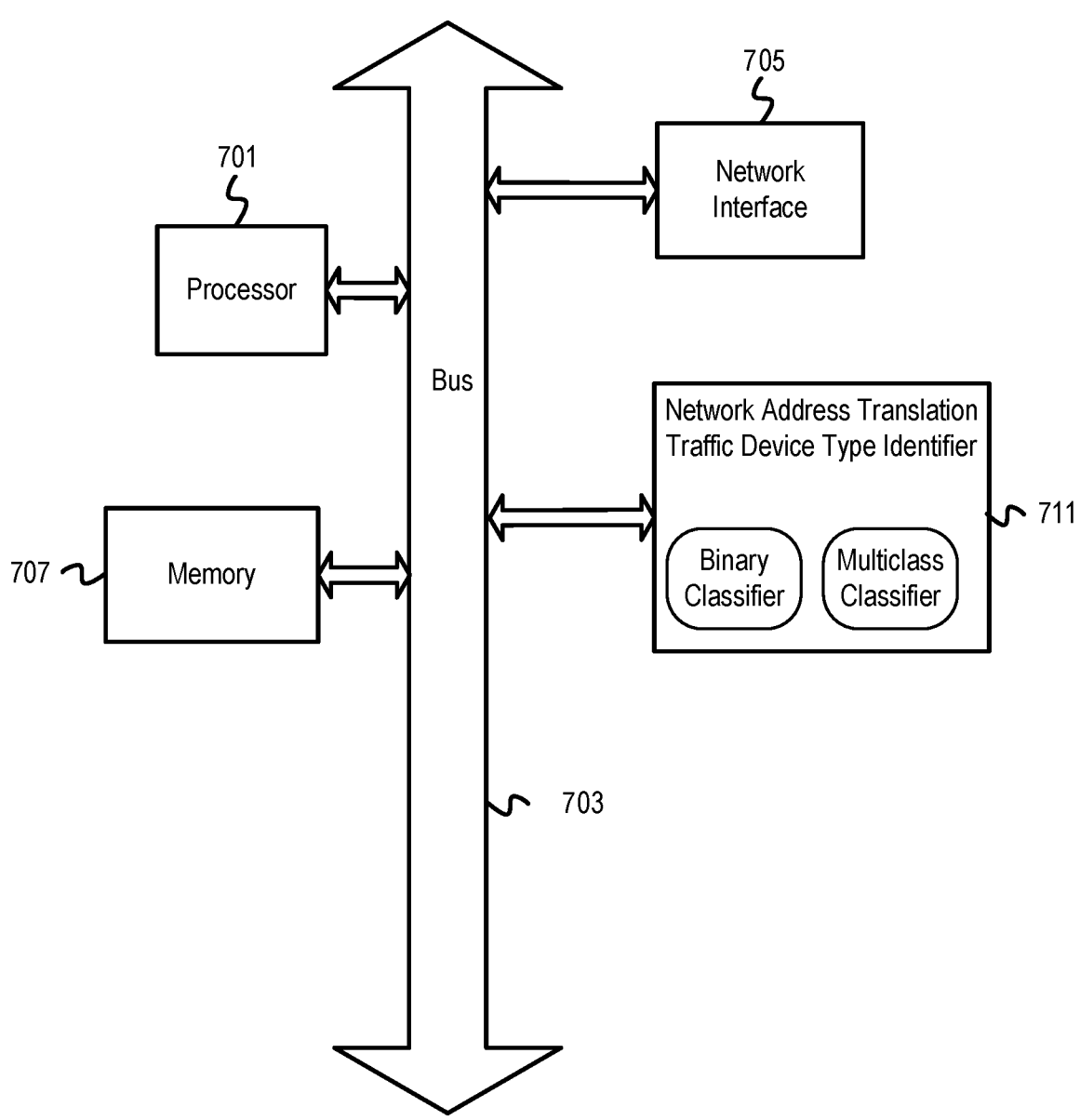
FIG. 7 depicts an example computer system with a NAT traffic device identifier.

FIG. 7 depicts an example computer system with a NAT traffic device identifier. The computer system includes a processor 701 (possibly including multiple processors, multiple cores, multiple nodes, and/or implementing multithreading, etc.). The computer system includes memory 707. The memory 707 may be system memory or any one or more of the above already described possible realizations of machine-readable media. The computer system also includes a bus 703 and a network interface 705. The system also includes a NAT traffic device identifier 711. The NAT traffic device identifier 711 uses a binary classifier and a multiclass classifier to discover device types, including types of IoT devices, that generate network traffic during a given time interval. The NAT traffic device identifier 711 uses the binary classifier to determine whether network traffic is from a network address translator and filter out network traffic that has not been NAT'd. For NAT'd traffic, the NAT traffic device identifier 711 processes each subinterval within the time interval of the NAT'd traffic with a multiclass classifier to determine a device type with a strongest signal among the one or more devices that sourced network traffic in the sub-interval. The NAT traffic device identifier 711 then provides a listing of the detected device types. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 605 are coupled to the bus 703. Although illustrated as being coupled to the bus 703, the memory 707 may be coupled to the processor 701.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
   determining values of a first set of features of network traffic from a network device to generate a first feature vector; and
   inputting the first feature vector into a first classifier to obtain an indication of whether or not the network device performed network address translation on the network traffic;
   based on an indication that the network device performed network address translation on the network traffic by the first classifier, for each subset of the network traffic in a corresponding time interval of the network traffic, determining values of a second set of features for the subset of the network traffic to generate a second feature vector; and
      inputting the second feature vector into a second classifier to obtain at least one device classification for the subset of the network traffic; and
   generating a profile of the network traffic based, at least in part, on the device classifications.

2. The method of claim 1, further comprising selecting those of the device classifications with confidence values that satisfy a confidence threshold, wherein generating the profile comprises listing device types corresponding to the selected ones of the device classifications.

3. The method of claim 1, wherein the first set of features and the second set of features comprise volumetric features of network traffic, static features of platforms, and application usage features.

4. The method of claim 3, wherein the application usage features comprise at least two of a listing of applications detected in network traffic, a listing of visited ports indicated in network traffic, and a listing of visited domains indicated in network traffic, wherein the volumetric features of the first set of features comprise at least two of application count, port count, uniform resource locator count, total bytes in network traffic, total sessions, total packets, and average time intervals per application, wherein the volumetric features of the second set of features comprise at least two of session count per application, session counter per network address, average packet size, and login count, and wherein the static features of platforms comprise at least one of operating system, hostname, user agent, device model, and manufacturer identifier.

5. The method of claim 1, wherein the first classifier is a binary classifier and the second classifier is a multiclass classifier.

6. The method of claim 1 further comprising training the first classifier with a training dataset that includes network traffic upon which network address translation was performed.

7. The method of claim 1 further comprising updating the profile or generating a new profile based, at least in part, on subsequently determined device classifications of subsequent network traffic with an indication that the network device performed network address translation on the subsequent network traffic.

8. One or more non-transitory, machine-readable media having program code stored thereon, the program code comprising instructions to:
   generate a device type profile for network traffic based on time-series samples of the network traffic using a set of trained models, wherein the instructions to generate the device type profile comprise instructions to, classify the network traffic as network address translated or not network address translated with a first trained model of the set of trained models;

based on the network traffic being classified as network address translated, indicate at least one device classification for each of a plurality of time-series samples of the network traffic with a second trained model of the set of models; and generate the device type profile based on the indications of the device classifications for the time-series samples classified as network address translated.

9. The machine-readable media of claim 8, wherein the program code further comprises instructions to update the device type profile based, at least in part, on subsequent network traffic, wherein the network traffic and the subsequent network traffic are from a same network device.

10. The machine-readable media of claim 8, wherein the program code further comprises instructions to generate a new device type profile based, at least in part, on subsequent network traffic, wherein the network traffic and the subsequent network traffic are from a same network device.

11. The machine-readable media of claim 8, wherein the first trained model is a binary classifier.

12. The machine-readable media of claim 11, wherein the binary classifier was trained with training data comprising first labeled network traffic labeled as network address translated.

13. The machine-readable media of claim 8, wherein the second trained model is a multiclass classifier and wherein the instructions to indicate at least one device classification for each time-series sample of the network traffic with the second trained model comprise instructions to indicate a first of a plurality of device types that corresponds to a classification with a highest confidence value from the second trained model.

14. The machine-readable media of claim 8, wherein the second trained model is a multiclass classifier and wherein the instructions to indicate at least one device classification for each time-series sample of the network traffic with the second trained model comprise instructions to indicate devices types corresponding to a top-N of a plurality of device classifications from the second trained model that satisfy a defined confidence threshold.

15. The machine-readable media of claim 8, wherein the instructions to classify the network traffic as network address translated or not network address translated with a first trained model of the set of trained models comprise instructions to determine values of a first feature set and generate a first feature vector based on the values that are input to the first trained model, wherein the first feature set comprises volumetric features of network traffic, static features of platforms, and application usage features.

16. The machine-readable media of claim 15, wherein application usage features comprise at least two of a listing of applications detected in network traffic, a listing of visited ports indicated in network traffic, and a listing of visited domains indicated in network traffic, wherein the volumetric features comprise at least two of application count, port count, uniform resource locator count, total bytes in network traffic, total sessions, total packets, and average time intervals per application, and wherein the static features of platforms comprise at least one of operating system, hostname, user agent, device model, and manufacturer identifier.

17. An apparatus comprising:

a processor; and a machine-readable medium having instructions stored thereon that are executable by the processor to cause the apparatus to, analyze behavior of network traffic from a network device to detect network address translation (NAT) behavior with a binary classifier, wherein the network traffic behavior is represented by a first set of features; and identify device types in a private network behind the network device based on device classifications of samples of the network traffic for which NAT behavior is detected, wherein the instructions to identify types of devices in the private network comprise instructions to, for each sample of the network traffic for which NAT behavior is detected, identify a device classification based on a second set of features and a multiclass classifier; and indicate the device classifications of the samples with detected NAT behavior as the types of devices in the private network.

18. The apparatus of claim 17, wherein the first set of features and the second set of features comprise volumetric features of network traffic, static features of platforms, and application usage features.

19. The apparatus of claim 18, wherein the application usage features comprise at least two of a listing of applications detected in network traffic, a listing of visited ports indicated in network traffic, and a listing of visited domains indicated in network traffic, wherein the volumetric features of the first set of features comprise at least two of application count, port count, uniform resource locator count, total bytes in network traffic, total sessions, total packets, and average time intervals per application, wherein the volumetric features of the second set of features comprise at least two of session count per application, session counter per network address, average packet size, and login count, and wherein the static features of platforms comprise at least one of operating system, hostname, user agent, device model, and manufacturer identifier.

20. The apparatus of claim 17, wherein the binary classifier is a random forest model and the multiclass classifier is a deep neural network.

* * * * *